(12) United States Patent
Weiland, Jr.

(10) Patent No.: US 11,439,257 B1
(45) Date of Patent: Sep. 13, 2022

(54) PHOTOGRAPHIC MIRROR ASSEMBLY

(71) Applicant: Richard H. Weiland, Jr., Amherst, OH (US)

(72) Inventor: Richard H. Weiland, Jr., Amherst, OH (US)

( * ) Notice: Subject to any disclaimer, the term of this patent is extended or adjusted under 35 U.S.C. 154(b) by 66 days.

(21) Appl. No.: 17/183,954

(22) Filed: Feb. 24, 2021

(51) Int. Cl.
*A47G 1/02* (2006.01)
*G02B 5/08* (2006.01)
*A47F 7/19* (2006.01)

(52) U.S. Cl.
CPC ............. *A47G 1/02* (2013.01); *G02B 5/0816* (2013.01); *A47F 2007/195* (2013.01)

(58) Field of Classification Search
CPC .......... A47G 1/02; A47G 1/04; G02B 5/0808; G02B 5/0816; A47F 7/021; A47F 2007/195
USPC ........ 359/839, 846, 850, 854, 865, 872, 877
See application file for complete search history.

(56) References Cited

U.S. PATENT DOCUMENTS

| | | | | |
|---|---|---|---|---|
| 1,451,236 A * | 4/1923 | Stanfield | ............... | A45D 42/18 359/881 |
| 1,859,592 A * | 5/1932 | Marchand | ............... | A47G 1/04 D26/56 |
| 2,201,251 A * | 5/1940 | Van Patten | ............. | A45D 42/10 D26/56 |
| 3,047,966 A * | 8/1962 | Greenspan | .............. | G09F 19/10 434/371 |
| 3,729,839 A * | 5/1973 | Bourdier | ................. | A47F 11/06 434/371 |
| 4,991,005 A * | 2/1991 | Smith | ...................... | H04N 7/18 434/371 |
| 6,142,628 A * | 11/2000 | Saigo | .................... | G02C 13/003 351/204 |
| 6,347,876 B1 * | 2/2002 | Burton | ................... | A45D 42/10 362/141 |
| 8,624,883 B2 | 1/2014 | Vilcovsky | | |
| 2005/0200963 A1 * | 9/2005 | Hoke | ................... | G02B 27/026 359/630 |
| 2007/0040033 A1 | 2/2007 | Rosenberg | | |
| 2008/0201641 A1 * | 8/2008 | Xie | ......................... | G06T 19/00 351/200 |
| 2008/0225123 A1 | 9/2008 | Osann | | |
| 2009/0128579 A1 * | 5/2009 | Xie | ...................... | G02C 13/005 345/634 |
| 2016/0171596 A1 | 6/2016 | Angerbauer | | |
| 2017/0148089 A1 | 5/2017 | Murzin | | |
| 2020/0219326 A1 * | 7/2020 | Goldberg | ................. | G06T 7/62 |

FOREIGN PATENT DOCUMENTS

WO      WO2011077423      6/2011

* cited by examiner

*Primary Examiner* — Ricky D Shafer

(57) ABSTRACT

A photographic mirror assembly includes a mirror which comprises a plurality of panels that are movably coupled together thereby facilitating a user to see themselves from a plurality of angles. An image capturing unit is integrated into the mirror to capture images of the user. The image capturing unit can overlay various eyeglasses onto the user to facilitate the user to view themselves wearing various eyeglasses prior to purchasing eyeglasses. An actuator is coupled to the mirror spacing the mirror an adjustable distance from the vertical support surface. A remote control is in wireless communication with the image capturing unit and the actuator to facilitate the user to remotely control operation of the image capturing unit and the actuator.

8 Claims, 7 Drawing Sheets

PHOTOGRAPHIC MIRROR ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to mirror device and more particularly pertains to a new mirror device for virtually trying on eyeglasses. The device includes a display that is integrated into a mirror and a camera that captures images of a user. The display displays images of eyeglasses overlaid onto an image of the user to facilitate the user to see themselves wearing a variety of eyeglasses.

(2) Description of Related Art Including Information Disclosed Under 37 CFR 1.97 and 1.98

The prior art relates to mirror devices including a variety of mirrors that have an electronic display integrated therein. In several instances, the electronic display can display a variety of clothes on a user. In no instance does the prior art disclose a mirror with a display integrated therein and which has an actuator for moving the mirror into a preferred location for the user.

BRIEF SUMMARY OF THE INVENTION

An embodiment of the disclosure meets the needs presented above by generally comprising a mirror which comprises a plurality of panels that are movably coupled together thereby facilitating a user to see themselves from a plurality of angles.
An image capturing unit is integrated into the mirror to capture images of the user. The image capturing unit can overlay various eyeglasses onto the user to facilitate the user to view themselves wearing various eyeglasses prior to purchasing eyeglasses. An actuator is coupled to the mirror spacing the mirror an adjustable distance from the vertical support surface. A remote control is in wireless communication with the image capturing unit and the actuator to facilitate the user to remotely control operation of the image capturing unit and the actuator.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
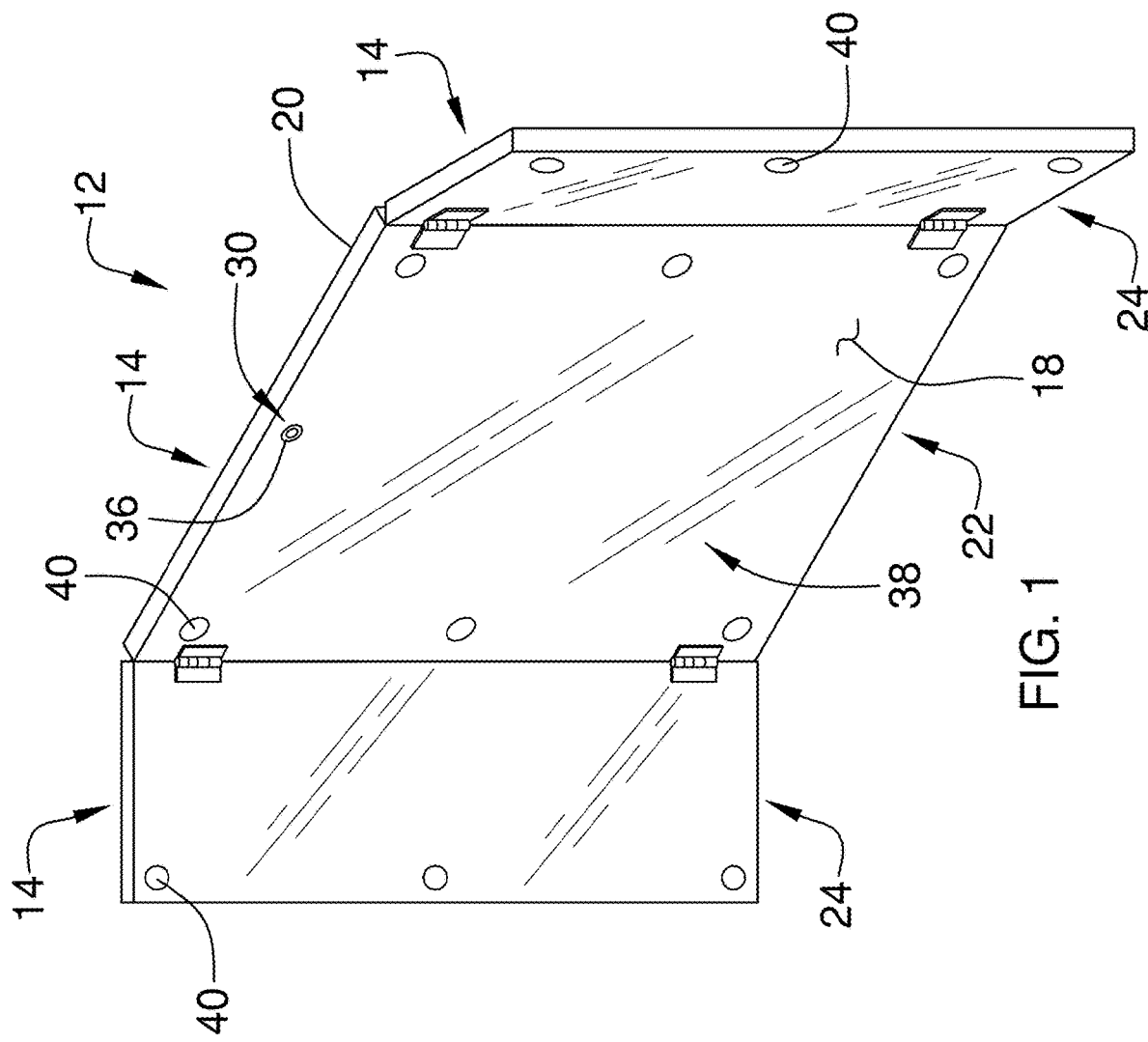
FIG. 1 is a front perspective view of a photographic mirror assembly according to an embodiment of the disclosure.
Figure 2:
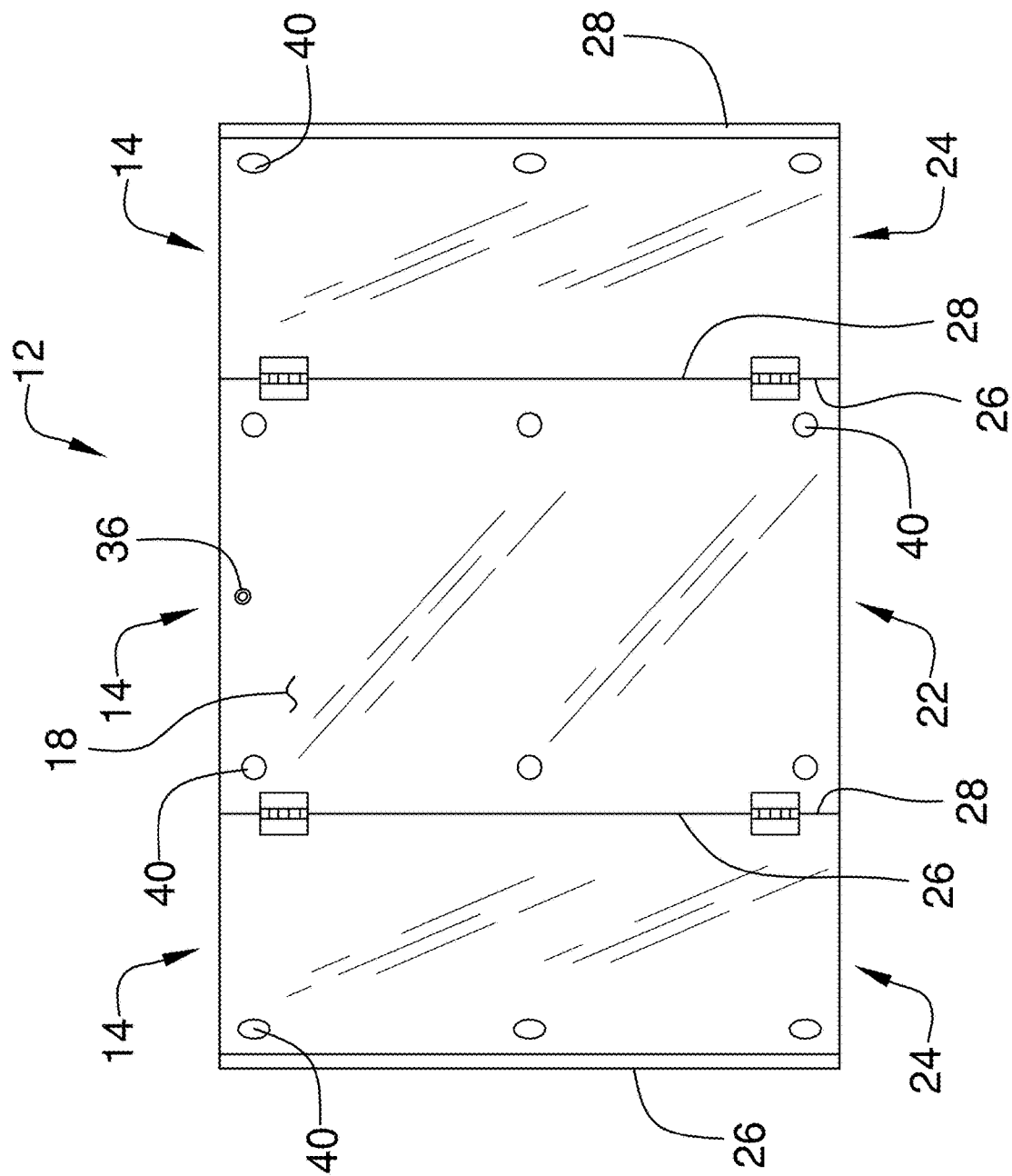
FIG. 2 is a front view of an embodiment of the disclosure.
Figure 3:
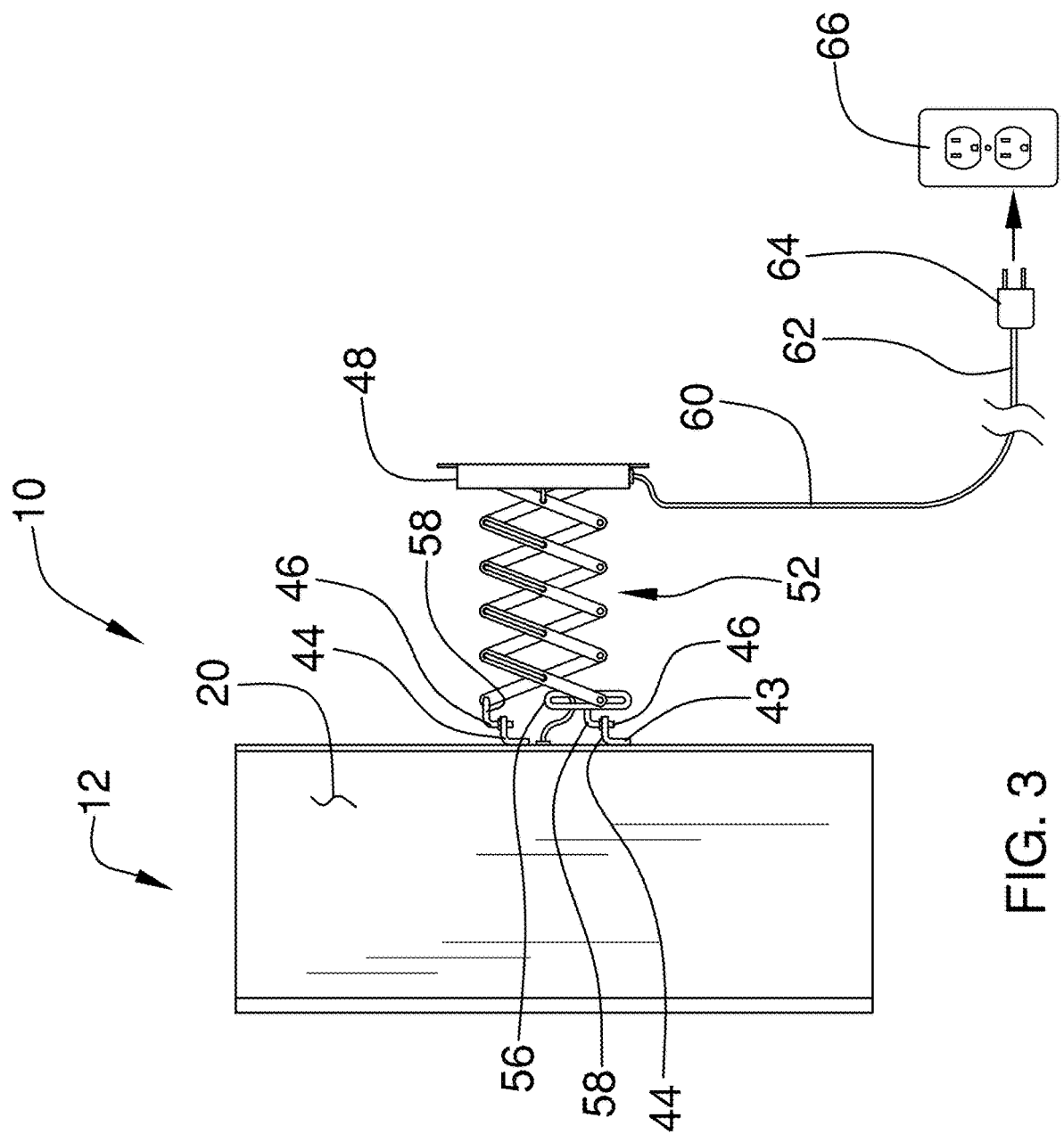
FIG. 3 is a right side view of an embodiment of the disclosure.
Figure 4:
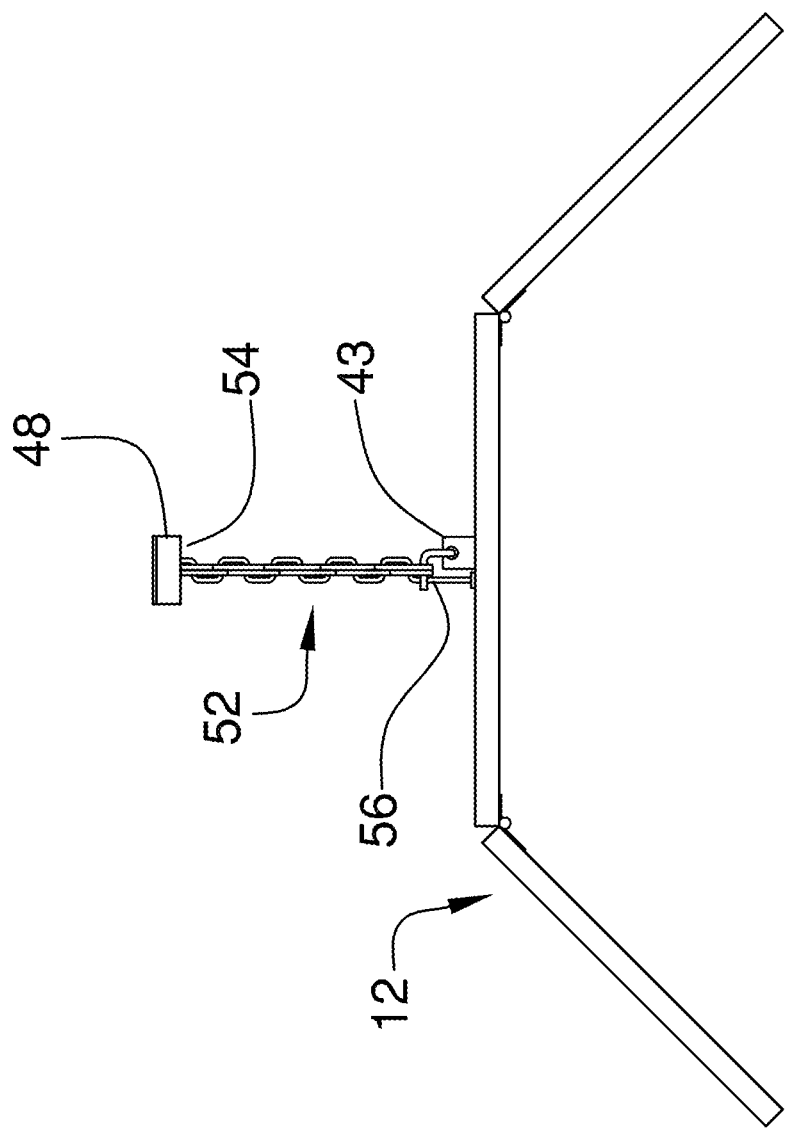
FIG. 4 is a top view of an embodiment of the disclosure.
Figure 5:
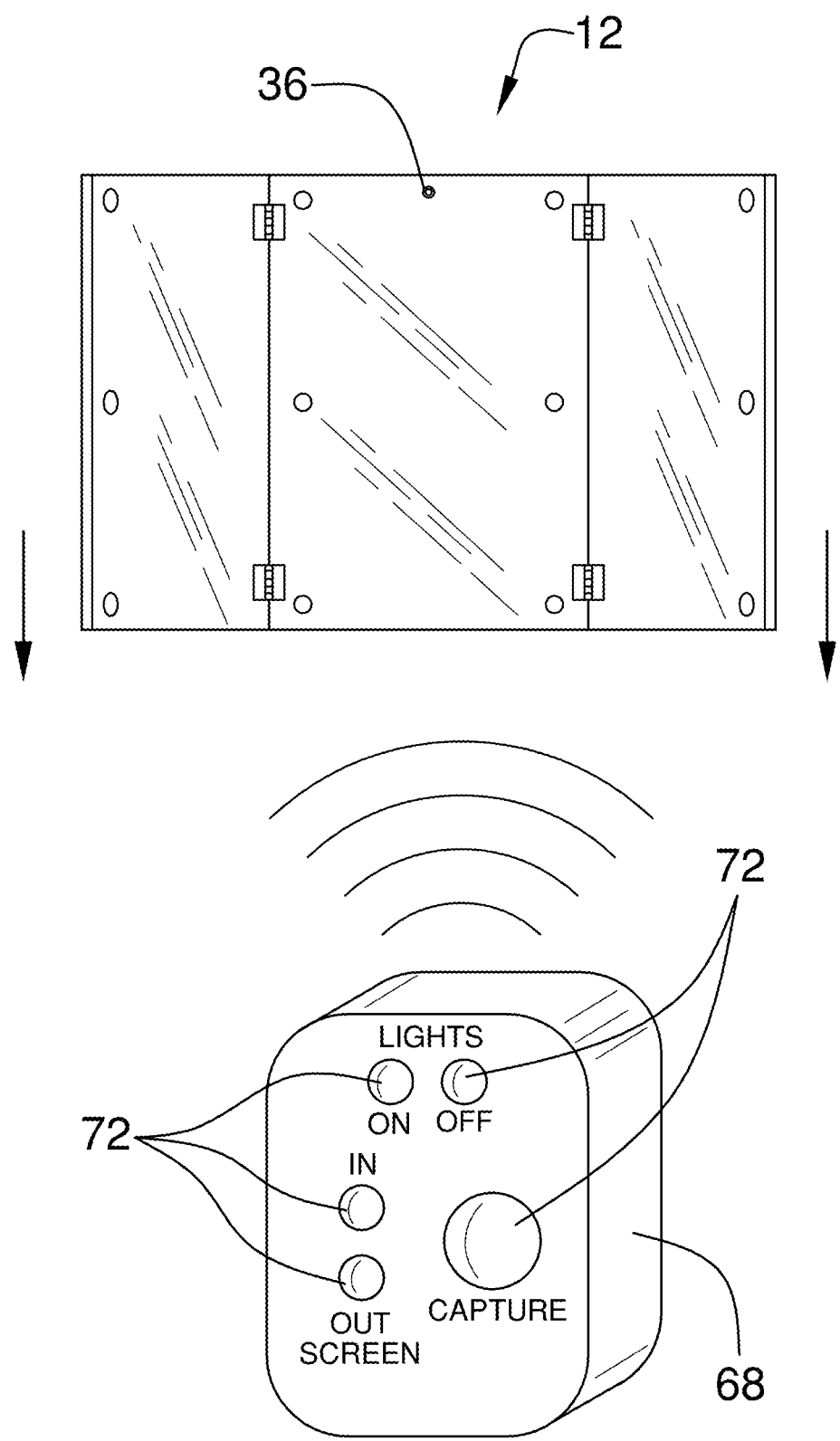
FIG. 5 is a perspective view of a remote control and a mirror of an embodiment of the disclosure.
Figure 6:
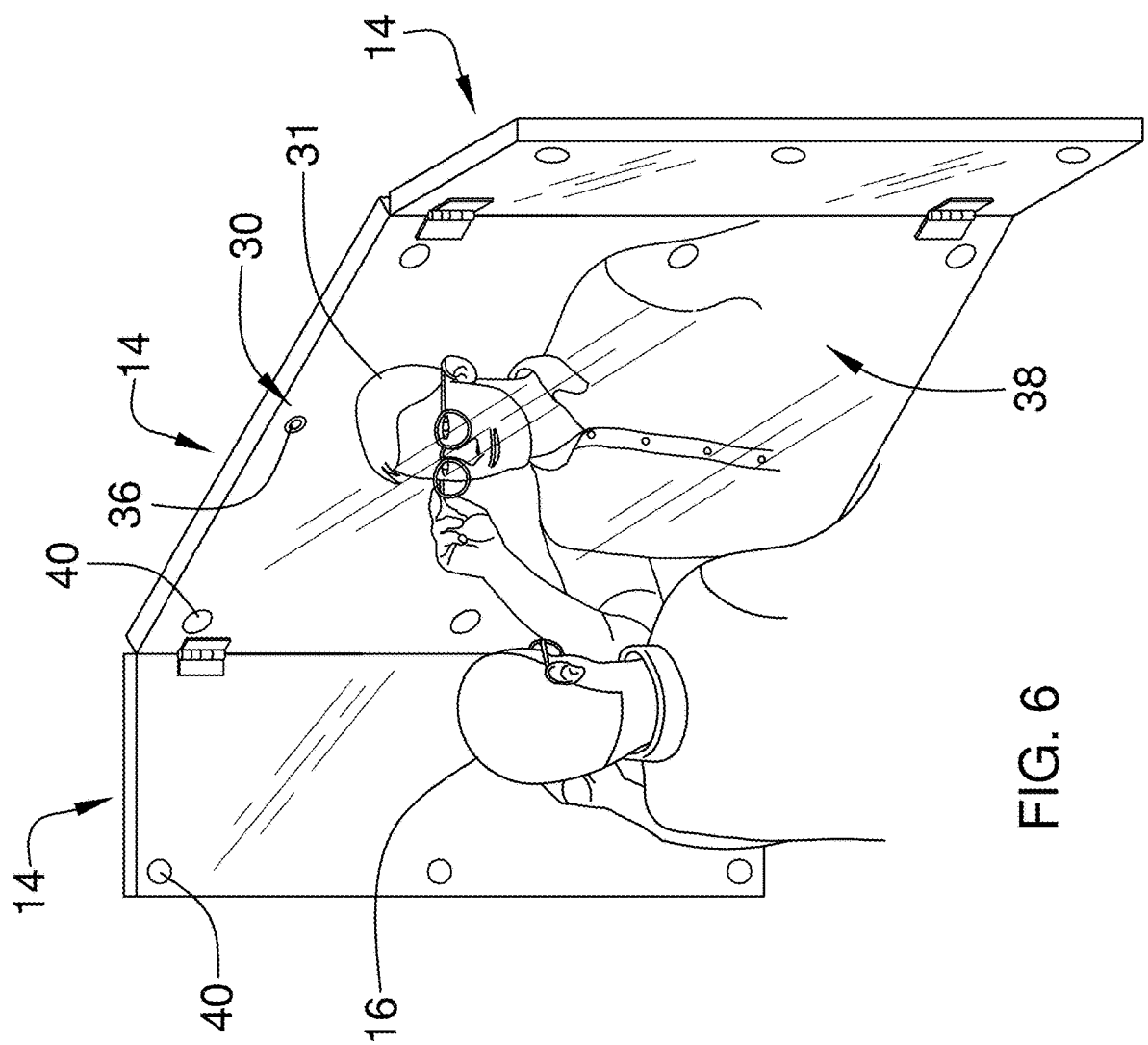
FIG. 6 is a perspective in-use view of an embodiment of the disclosure.
Figure 7:
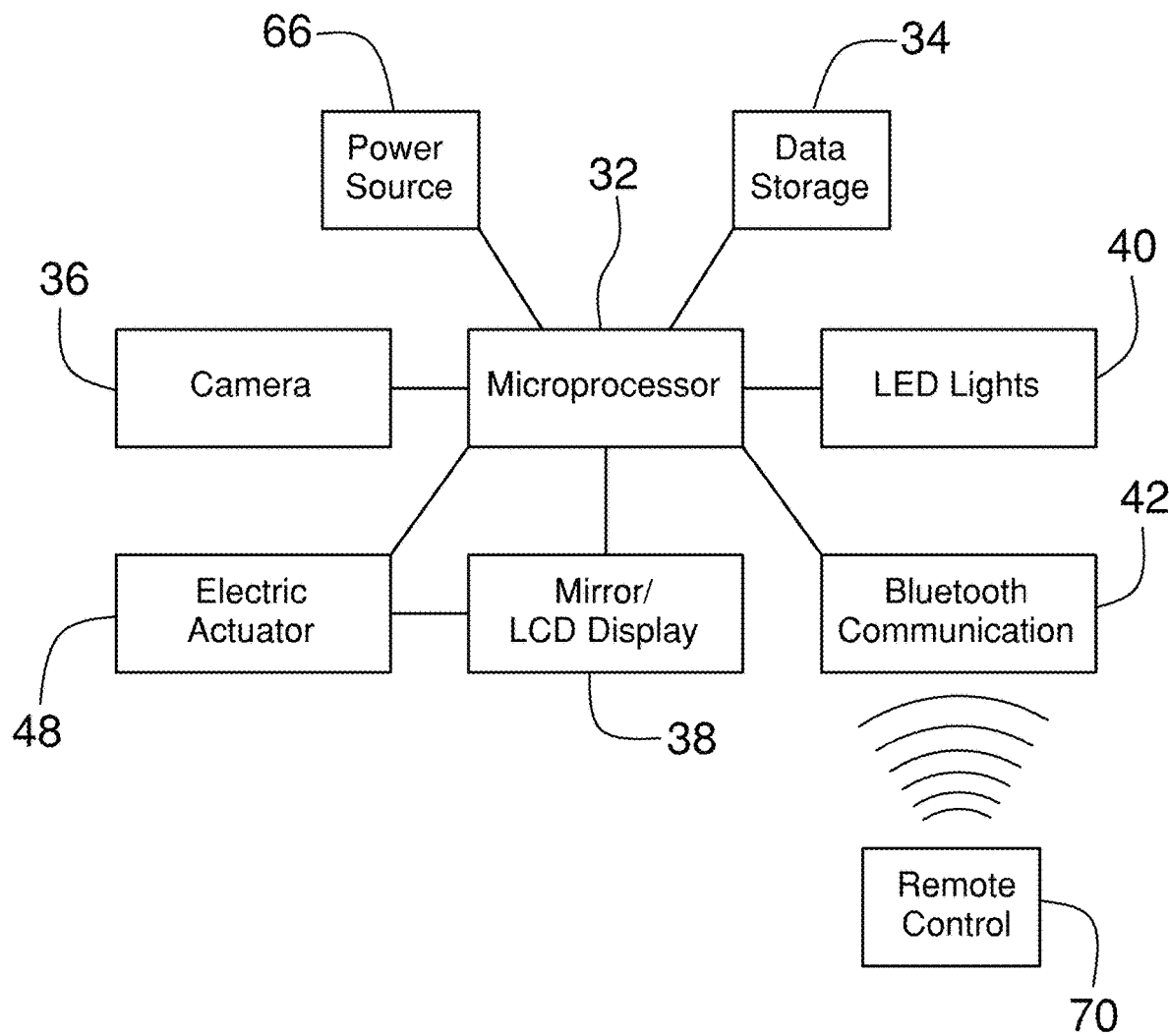
FIG. 7 is a schematic view of an embodiment of the disclosure.

With reference now to the drawings, and in particular to FIGS. 1 through 7 thereof, a new mirror device embodying the principles and concepts of an embodiment of the disclosure and generally designated by the reference numeral 10 will be described.

As best illustrated in FIGS. 1 through 7, the photographic mirror assembly 10 generally comprises a mirror 12 which includes a plurality of panels 14 that are movably coupled together to facilitate a user 16 to see themselves from a plurality of angles. The mirror 12 has a front surface 18 and a back surface 20, and the plurality of panels 14 includes a center panel 22 and a pair of end panels 24. Each of the center panel 22 and the end panels 24 has a first lateral edge 26 and a second lateral edge 28. The second lateral edge 28 of a respective one of the end panels 24 is hingedly coupled to the first lateral edge 26 of the center panel. Additionally, the first lateral edge 26 of a respective one of the end panels 24 is hingedly coupled to the second lateral edge 28 of the center panel 22.

An image capturing unit 30 is integrated into the mirror 12 to capture images of the user 16. The image capturing unit 30 stores images of eyeglasses 31 and the image capturing unit 30 has digital image manipulation capabilities. In this way the image capturing unit 30 can overlay various eyeglasses 31 onto the user 16 to facilitate the user 16 to view themselves wearing various eyeglasses 31 prior to purchasing eyeglasses 31. The image capturing unit 30 comprises a control circuit 32 that is integrated into the mirror 12. The image capturing unit 30 includes an electronic memory 34 that is integrated into the mirror 12 and the control circuit 32 is electrically coupled to the control circuit 32. The electronic memory 34 stores a database comprising imagery of eyeglasses 31 and the electronic memory 34 stores operational software for digital image manipulation. The operational software may include a graphic user interface for selecting images of eyeglasses 31 and for controlling operation of the digital image manipulation.

The image capturing unit 30 includes a camera 36 that is integrated into the mirror 12 to capture imagery of the user 16. The camera 36 is electrically coupled to the control circuit 32 and the camera 36 communicates imagery of the user 16 to the electronic memory 34. In this way the operational software can overlay selected images of eyeglasses 31 onto the user 16's face. The camera 36 may be a digital camera of any conventional design.

The image capturing unit 30 includes a display 38 that is integrated into the mirror 12 to display imagery of the user 16 on the mirror 12. The display 38 is recessed behind the front surface 18 of the mirror 12 such that the display 38 does not inhibit the mirror 12 from reflecting the user 16. The display 38 is integrated into the center panel, the display 38 is electrically coupled to the control circuit 32 and the display 38 receives imagery of eyeglasses 31 overlaid onto the user's 16 face. In this way the display 38 can facilitate the user 16 to view themselves wearing various eyeglasses 31. The display 38 may comprise a transparent, flat screen display, such as an LCD or the like, that can be integrated into a one-way mirror.

The image capturing unit 30 includes a plurality of light emitters 40 that is each coupled to the mirror 12 to emit light outwardly therefrom for enhancing the user 16's ability to see themselves in the mirror 12. Each of the light emitters 40 is positioned on a respective one of the center panel 22 and the end panels 24. Additionally, the light emitters 40 are spaced apart from each other and are distributed around a perimeter of the respective center panel 22 and the end panels 24. Each of the light emitters 40 is electrically coupled to the control circuit 32 and each of the light emitters 40 is positioned on the front surface 18 of the mirror 12. The image capturing unit 30 includes a transceiver 42 that is integrated into the mirror 12 and the transceiver 42 is electrically coupled to the control circuit 32. The transceiver 42 may comprise a radio frequency transceiver or the like and the transceiver 42 may employ Bluetooth communication protocols.

A coupling 43 is coupled to the back surface 20 of the mirror 12 and the coupling 43 is positioned on the center panel. The coupling 43 might include a pair of brackets 44 that each has an aperture 46 extending therethrough. An actuator 48 is coupled to the mirror 12 and the actuator 48 is attachable to a vertical support surface 50 thereby facilitating the mirror 12 to be positioned at a predetermined height for accommodating the user 16. The actuator 48 is extendable between an extended position and a retracted position thereby facilitating the mirror 12 to be spaced an adjustable distance from the vertical support surface 50. In this way the actuator 48 can optimally position the mirror 12 for the user 16.

The actuator 48 includes a scissor arm 52 that is movably coupled to and extends away from a front side 54 of the actuator 48. The scissor arm 52 is collapsible or extendable along a horizontally oriented axis when the actuator 48 is attached to the vertical support surface 50. Additionally, the scissor arm 52 has a distal end 56 with respect to the actuator 48 and the distal end 56 is movably coupled to the coupling 43 on the center panel 22 of the mirror 12. The actuator 48 is electrically coupled to the control circuit 32 and the actuator 48 may comprise an electric motor with a drive system that integrates with the scissor arm 52 for collapsing and extending the scissor arm 52. Additionally, the scissor arm 52 may have a pair of fingers 58, each disposed on the distal end 56 of the scissor arm 52, which pivotally engages the aperture 46 in a respective one of the brackets 44 which comprise the coupling 43.

A power cord 60 is coupled to and extends away from the actuator 48 and the power cord 60 is in electrical communication with the control circuit 32. The power cord 60 has a distal end 62 with respect to the actuator 48 and a male plug 64 is electrically coupled to the distal end 62 of the power cord 60. The male plug 64 is pluggable into a power source 66 comprising a female electrical outlet, for supplying electrical power to the actuator 48.

A remote control 68 is provided and the remote control 68 is in wireless communication with the image capturing unit 30 and the actuator 48. In this way the remote control 68 can facilitate the user 16 to remotely control operation of the image capturing unit 30 and the actuator 48. The remote control 68 includes a transmitter 70 that is in wireless communication with the transceiver 42. The remote control 68 includes a plurality of control buttons 72 that is each in electrical communication with the transmitter 70. Moreover, the transmitter 70 broadcasts a variety of command signals to the transceiver 42 when the control buttons 72 are manipulated. The plurality of control buttons 72 might include a light on button, a light off button, a screen in button, a screen out button and a capture button.

In use, the user 16 stands in front of the mirror 12 such that the camera 36 can capture an image of the user 16. The user 16 chooses various eyeglasses 31 that the user 16 wishes to view themselves wearing and the display 38 subsequently displays the image of the user 16 with the eyeglasses 31 overlaid onto the image of the user 16. In this way the user 16 can virtually try on many pairs of eyeglasses 31, without having to look through lenses of actual eyeglasses, when the user 16 is shopping for eyeglasses 31. Additionally, the actuator 48 can be employed to move the mirror 12 toward or away from the user 16 to accommodate the user 16's preference.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A photographic mirror assembly for facilitating a user to view themselves virtually wearing a variety of eyeglasses prior to purchasing eyeglasses, said assembly comprising:
a mirror comprising a plurality of panels being movably coupled together wherein said mirror is configured to facilitate a user to see themselves from a plurality of angles;
an image capturing unit being integrated into said mirror wherein said image capturing unit is configured to capture images of the user, said image capturing unit storing images of eyeglasses, said image capturing unit having digital image manipulation capabilities wherein said image capturing unit is configured to overlay various eyeglasses onto the user to facilitate the user to view themselves wearing various eyeglasses prior to purchasing eyeglasses;
an actuator being coupled to said mirror, said actuator being attachable to a vertical support surface wherein said mirror is configured to be positioned at a predetermined height for accommodating the user, said actuator being extendable between an extended position and a retracted position thereby facilitating said mirror to be spaced an adjustable distance from the vertical support surface wherein said actuator is configured to optimally position said mirror for the user; and
a remote control being in wireless communication with said image capturing unit and said actuator wherein said remote control is configured to facilitate the user to remotely control operation of said image capturing unit and said actuator.

2. The assembly according to claim 1, wherein:
said mirror has a front surface and a back surface, said plurality of panels including a center panel and a pair of end panels, each of said center panel and said end panels having a first lateral edge and a second lateral edge, said first lateral edge of said center panel having said second lateral edge of a respective one of said end panels being hingedly coupled thereto, said second lateral edge of said center panel having said first lateral edge of a respective one of said end panels being hingedly coupled thereto; and
said image capturing unit includes a display being integrated into said mirror wherein said display is configured to display imagery of the user on said mirror, said display being recessed behind said front surface of said mirror wherein said display is configured to not inhibit said mirror from reflecting the user, said display being integrated into said center panel.

3. The assembly according to claim 2, wherein said image capturing unit includes a plurality of light emitters, each of said light emitters being coupled to said mirror wherein each of said light emitters is configured to emit light outwardly therefrom for enhancing the user's ability to see themselves in said mirror, each of said light emitters being positioned on a respective one of said center panel and said end panels, said light emitters being spaced apart from each other and being distributed around a perimeter of said respective center panel and said end panels, each of said light emitters being positioned on said front surface of said mirror.

4. The assembly according to claim 1, wherein said image capturing unit comprises:
a control circuit being integrated into said mirror;
an electronic memory being integrated into said mirror, said control circuit being electrically coupled to said control circuit, said electronic memory storing a database comprising imagery of eyeglasses, said electronic memory storing operational software for digital image manipulation; and
a camera being integrated into said mirror wherein said camera is configured to capture imagery of the user, said camera being electrically coupled to said control circuit, said camera communicating imagery of the user to said electronic memory wherein said operational software is configured to overlay selected images of eyeglasses onto the user's face.

5. The assembly according to claim 4, wherein said display is electrically coupled to said control circuit, said display receiving imagery of eyeglasses being overlaid onto the user's face wherein said display is configured to facilitate the user to view themselves wearing various eyeglasses.

6. The assembly according to claim 4, wherein:
said image capturing unit includes a transceiver being integrated into said mirror, said transceiver being electrically coupled to said control circuit; and
said remote control includes a transmitter being in wireless communication with said transceiver, said remote control including a plurality of control buttons each being in electrical communication with said transmitter, said transmitter broadcasting a variety of command signals to said transceiver when said control buttons are manipulated, said plurality of control buttons including a light on button, a light off button, a screen in button, a screen out button and a capture button.

7. The assembly according to claim 1, wherein:
said assembly includes a coupling being coupled to said back surface of said mirror, said coupling being positioned on said center panel;
said actuator includes a scissor arm being movably coupled to and extending away from a front side of said actuator, said scissor arm being collapsible or extendable along a horizontally oriented axis when said actuator is attached to the vertical support surface, said scissor arm having a distal end with respect to said actuator, said distal end being movably coupled to said coupling on said center panel of said mirror.

8. A photographic mirror assembly for facilitating a user to view themselves virtually wearing a variety of eyeglasses prior to purchasing eyeglasses, said assembly comprising:
a mirror comprising a plurality of panels being movably coupled together wherein said mirror is configured to facilitate a user to see themselves from a plurality of angles, said mirror having a front surface and a back surface, said plurality of panels including a center panel and a pair of end panels, each of said center panel and said end panels having a first lateral edge and a second lateral edge, said first lateral edge of said center panel having said second lateral edge of a respective one of said end panels being hingedly coupled thereto, said second lateral edge of said center panel having said first lateral edge of a respective one of said end panels being hingedly coupled thereto;
an image capturing unit being integrated into said mirror wherein said image capturing unit is configured to capture images of the user, said image capturing unit storing images of eyeglasses, said image capturing unit having digital image manipulation capabilities wherein said image capturing unit is configured to overlay various eyeglasses onto the user to facilitate the user to view themselves wearing various eyeglasses prior to purchasing eyeglasses, said image capturing unit comprising:
a control circuit being integrated into said mirror;
an electronic memory being integrated into said mirror, said control circuit being electrically coupled to said control circuit, said electronic memory storing a database comprising imagery of eyeglasses, said electronic memory storing operational software for digital image manipulation;
a camera being integrated into said mirror wherein said camera is configured to capture imagery of the user, said camera being electrically coupled to said control circuit, said camera communicating imagery of the user to said electronic memory wherein said operational software is configured to overlay selected images of eyeglasses onto the user's face;
a display being integrated into said mirror wherein said display is configured to display imagery of the user on said mirror, said display being recessed behind said front surface of said mirror wherein said display is configured to not inhibit said mirror from reflecting the user, said display being integrated into said center panel, said display being electrically coupled to said control circuit, said display receiving imagery of eyeglasses being overlaid onto the user's face wherein said display is configured to facilitate the user to view themselves wearing various eyeglasses;
a plurality of light emitters, each of said light emitters being coupled to said mirror wherein each of said light emitters is configured to emit light outwardly therefrom for enhancing the user's ability to see themselves in said mirror, each of said light emitters being positioned on a respective one of said center panel and said end panels, said light emitters being spaced apart from each other and being distributed around a perimeter of said respective center panel and said end panels, each of said light emitters being electrically coupled to said control circuit, each of said light emitters being positioned on said front surface of said mirror; and
a transceiver being integrated into said mirror, said transceiver being electrically coupled to said control circuit;
a coupling being coupled to said back surface of said mirror, said coupling being positioned on said center panel;
an actuator being coupled to said mirror, said actuator being attachable to a vertical support surface wherein said mirror is configured to be positioned at a predetermined height for accommodating the user, said actuator being extendable between an extended position and a retracted position thereby facilitating said mirror to be spaced an adjustable distance from the vertical support surface wherein said actuator is configured to optimally position said mirror for the user, said actuator including a scissor arm being movably coupled to and extending away from a front side of said actuator, said scissor arm being collapsible or extendable along a horizontally oriented axis when said actuator is attached to the vertical support surface, said scissor arm having a distal end with respect to said actuator, said distal end being movably coupled to said coupling on said center panel of said mirror, said actuator being electrically coupled to said control circuit;
a power cord being coupled to and extending away from said actuator, said power cord being in electrical communication with said control circuit, said power cord having a distal end with respect to said actuator, said distal end having a male plug being electrically coupled to thereto, said male plug being pluggable into a power source comprising a female electrical outlet; and
a remote control being in wireless communication with said image capturing unit and said actuator wherein said remote control is configured to facilitate the user to remotely control operation of said image capturing unit and said actuator, said remote control including a transmitter being in wireless communication with said transceiver, said remote control including a plurality of control buttons each being in electrical communication with said transmitter, said transmitter broadcasting a variety of command signals to said transceiver when said control buttons are manipulated, said plurality of control buttons including a light on button, a light off button, a screen in button, a screen out button and a capture button.

\* \* \* \* \*